(12) United States Patent
Latheef et al.

(10) Patent No.: US 10,481,752 B2
(45) Date of Patent: Nov. 19, 2019

(54) METHOD AND DEVICE FOR A GUIDED APPLICATION TO ENHANCE A USER INTERFACE

(71) Applicant: Verizon Patent and Licensing Inc., Arlington, VA (US)

(72) Inventors: Sudhin Vellooparambil Latheef, Hillsborough, NJ (US); Sankar Shanmugam, Dayton, NJ (US); Moorthy Sengottaiyan, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/793,753

(22) Filed: Oct. 25, 2017

(65) Prior Publication Data
US 2019/0121495 A1    Apr. 25, 2019

(51) Int. Cl.
| G06F 3/0481 | (2013.01) |
| G06F 3/0484 | (2013.01) |
| H04L 12/58 | (2006.01) |
| G06F 9/54 | (2006.01) |
| G06F 9/451 | (2018.01) |

(52) U.S. Cl.
CPC .......... *G06F 3/0481* (2013.01); *G06F 3/0484* (2013.01); *G06F 9/453* (2018.02); *G06F 9/54* (2013.01); *H04L 51/04* (2013.01); *G06T 2200/24* (2013.01)

(58) Field of Classification Search
CPC ...................................................... G06F 9/453
USPC ......................................................... 715/708
See application file for complete search history.

(56) References Cited

U.S. PATENT DOCUMENTS

| 6,020,886 | A | * | 2/2000 | Jacober | .................. | G06F 9/453 |
| | | | | | | 715/709 |
| 7,000,187 | B2 | * | 2/2006 | Messinger | .............. | G06F 9/453 |
| | | | | | | 715/705 |
| 9,344,673 | B1 | * | 5/2016 | Buchheit | ................ | H04N 7/144 |
| 9,613,020 | B1 | * | 4/2017 | Jacobs, II | ............... | G06F 17/50 |
| 2009/0094552 | A1 | * | 4/2009 | Watson | .............. | G06F 3/04842 |
| | | | | | | 715/804 |
| 2009/0158205 | A1 | * | 6/2009 | Hampton | ................ | G06F 9/453 |
| | | | | | | 715/790 |
| 2010/0070872 | A1 | * | 3/2010 | Trujillo | ............... | G06F 3/04892 |
| | | | | | | 715/745 |
| 2010/0093319 | A1 | * | 4/2010 | Sherman | ........... | H04M 3/42178 |
| | | | | | | 455/414.1 |
| 2010/0192063 | A1 | * | 7/2010 | Saoumi | .................... | G06F 9/453 |
| | | | | | | 715/707 |
| 2011/0131491 | A1 | * | 6/2011 | Lu | ......................... | G06F 16/957 |
| | | | | | | 715/708 |
| 2011/0223944 | A1 | * | 9/2011 | Gosselin | ................ | H04W 4/21 |
| | | | | | | 455/466 |
| 2011/0271185 | A1 | * | 11/2011 | Chen | ...................... | G06F 9/453 |
| | | | | | | 715/708 |

(Continued)

Primary Examiner — Daniel Rodriguez

(57) ABSTRACT

A device can be configured to provide a request for assistance with performing a task, receive instructions, launch, using the instructions, an application associated with the task, and cause display of a transparent overlay on top of a display of the application. The transparent overlay can include an instruction for a user, and the device can receive user input that corresponds to the instruction and perform an action based on the user input and the received instructions.

20 Claims, 5 Drawing Sheets

(56) References Cited

U.S. PATENT DOCUMENTS

| | | | |
|---|---|---|---|
| 2012/0013548 A1* | 1/2012 | Choi | B60K 35/00 345/173 |
| 2012/0115122 A1* | 5/2012 | Bruce | G09B 7/00 434/323 |
| 2013/0151999 A1* | 6/2013 | Seul | G06F 3/0481 715/762 |
| 2015/0066382 A1* | 3/2015 | Von Allmen | G06F 19/34 702/19 |
| 2015/0143091 A1* | 5/2015 | Brace | G06F 9/455 713/1 |
| 2015/0243288 A1* | 8/2015 | Katsuranis | G06F 3/0484 704/275 |
| 2015/0248839 A1* | 9/2015 | Strode | G09B 5/02 434/118 |
| 2016/0147544 A1* | 5/2016 | Kaplan | G06F 16/9566 715/712 |
| 2016/0283846 A1* | 9/2016 | Keohane | G06F 9/453 |
| 2016/0283847 A1* | 9/2016 | Keohane | G06F 3/01 |
| 2016/0335643 A1* | 11/2016 | Trunick | G06Q 30/01 |
| 2018/0150206 A1* | 5/2018 | Suzuki | G06F 3/0483 |
| 2018/0277007 A1* | 9/2018 | Mark | G09B 7/02 |
| 2018/0285063 A1* | 10/2018 | Huynh | G06F 3/167 |

\* cited by examiner

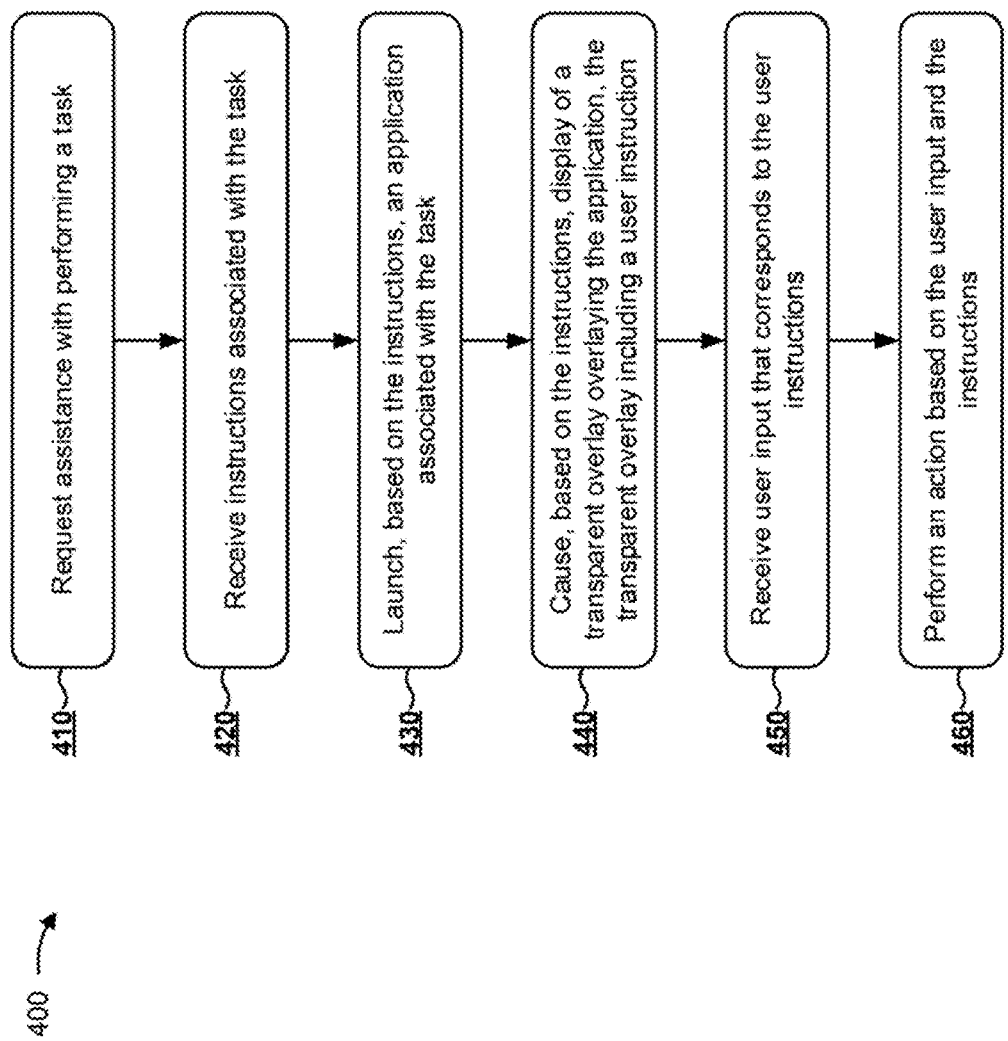

METHOD AND DEVICE FOR A GUIDED APPLICATION TO ENHANCE A USER INTERFACE

BACKGROUND

Customer support for software applications can include a range of customer services to assist customers in operating their user devices. For example, a user can be provided with step by step instructions by a customer support representative and/or with reference to a web page.

BRIEF DESCRIPTION OF THE DRAWINGS

FIG. 4 is a flow chart of an example process for providing guided support for performing a task.

DETAILED DESCRIPTION OF PREFERRED EMBODIMENTS

Figure 1A:
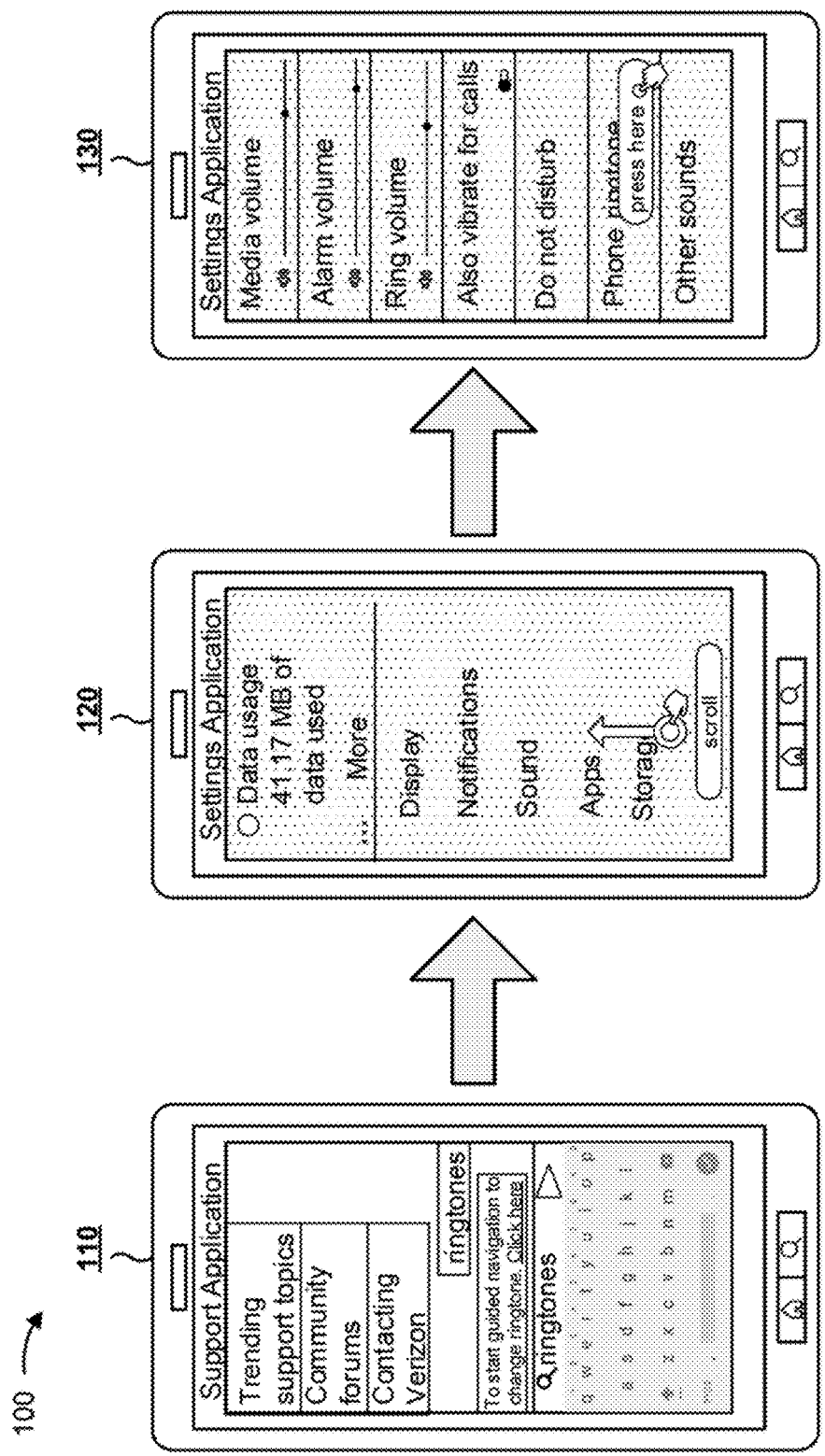
FIGS. 1A and 1B are diagrams of an overview of an example implementation described herein.

The following detailed description of example implementations refers to the accompanying drawings. The same reference numbers in different drawings can identify the same or similar elements.

For a variety of reasons, users might have difficulty performing various tasks that are capable of being performed using a user device. In some situations, users might simply be unaware of how to perform a particular task due to unfamiliarity with the user device and/or complexities of the user device or software operating on the user device. In these situations, users often seek help in a variety of ways (e.g., searching the Internet for instructions on how to perform the particular task and/or calling a customer service line associated with the user device). The solutions often involve step-by-step instructions that are provided to a user for the user to follow. However, the instructions can vary based on the type of user device and/or software involved, and user experience might suffer in situations where instructions to perform the particular task are incorrect and/or take time to find and/or follow. In addition, entities that provide customer support incur costs associated with providing support for users, including resource usage and opportunity costs.

Some implementations, described herein, provide a user device that is capable of providing instructions that are based on a user's request for assistance with performing a particular task. The instructions cause a first application of the user device (e.g., a support application) to launch a second application that is associated with the particular task and overlay instructions for the user to follow using the first application to provide the overlay. User input can be passed through the transparent overlay to the second application, and the first application can update the overlay with new instructions for the user to follow, e.g., based on reading the underlying data displayed by the second application. In this way, a user can be provided with instructions that enable the user to perform the particular task. In addition, the instructions can be tailored to the user device and/or software being used, and can be provided without using a customer service representative to provide step-by-step instructions.

In this way, implementations described herein can provide a user with an enhanced user experience (e.g., by obviating the need to research instructions or call customer support to potentially wait for a representative capable of providing step-by-step instructions). For an entity associated with the user device and/or an entity associated with an application associated with the particular task, enhancing user experience can lead to increased customer satisfaction with the entity's corresponding application and/or user device. In addition, by obviating the need to use a live customer support representative to provide users with step-by-step instructions, an entity that provides customer support services can save resources, including time, enabling customer support resources to be used for other tasks, reducing customer service wait times and further increasing user satisfaction with customer support services.

Implementations described herein reduce computing resource usage, including processing, memory, and network bandwidth when compared using customer support services or manual troubleshooting. For example, manual troubleshooting often involves researching and/or a trial and error approach that consumes resources, including time, battery life, and network bandwidth, which can be avoided by obtaining guided support. The use of customer support services can also result in trial and error support due to differences in device operating systems, software versions, and/or the like. In addition, the use of a support application to overlay another application can be performed without requiring any modification of or support from the other application, obviating the need for other application developers to provide their own support guides, and support for those other applications can be implemented in instructions for the guided support application described herein. A guided support application, as described here, can also provide flexibility in providing support, by using instructions that can be modified, e.g., based on changes to user devices and/or underlying applications.

FIG. 1A is a diagram of an overview of an example implementation 100 described herein. As shown in FIG. 1A, example implementation 100 includes a user device (e.g., a mobile phone or computer) that can include various applications for performing a variety of tasks. Applications and/or tasks can, for example, be associated with productivity, communication, and/or entertainment.

As further shown in FIG. 1A, and by reference number 110, the user device includes a first application through which a user can request assistance with performing a particular task. Assistance can be provided, for example, in the form of application instructions provided to the first application of the user device. Instructions can be provided and/or accessed in a variety of ways, such as clicking on a support link provided in the first application, interacting with an application notification, and/or the like. For example, as shown, a user sent "ringtone" to a support application that responded with a link to select to receive guided support for changing the ringtone of the user device. In this example, "ringtone" might have been sent to a local support database or support server, either of which could have provided instructions accessible by the "click here" link.

As further shown in FIG. 1A, and by reference number 120, the user device provides, based on the instructions, a partially transparent overlay in a first application that overlays a second application, an interface of which is rendered for display. The first application (e.g., a support application) includes a transparent overlay with instructions displayed for the user to follow. The displayed instructions are based on the instructions received from the support application. The second application is the application that will be used to perform the particular task (e.g., a settings application capable of being used to change a ringtone of the user device).

As further shown by reference number 120, the instructions displayed in the first application overlay (e.g., "scroll down") can be based on the instructions provided by the support application. For example, the instructions can include data identifying the second application (e.g., the application to be used to perform the particular task) and step-by-step instructions to be displayed in the overlay. In some implementations, the first application can launch the second application based on the instructions.

In some implementations, the first application can read data displayed by the second application (e.g., using accessibility features of the user device) to determine what is shown in the second application and, based on what is shown in the second application, the first application can determine which instructions are to be displayed. For example, the instructions "scroll down" can be displayed by the first application until the "ringtone" setting is displayed by the second application.

In some implementations, the second application can receive user input from the first application. For example, when a user performs a scrolling down gesture on the user device, the first application receives the user input and passes the user input through to the second application. The second application then processes the user input accordingly (e.g., by scrolling down the list in the settings application), as if the first application were not present.

As further shown in FIG. 1A, and by reference number 130, the user device provides an updated overlay based on the user input and the instructions. For example, based on user input received as discussed with reference to reference number 120, the second application can scroll down. The first application can then read "ringtone" in the second application and, based on reading "ringtone," the first application can update the overlay to display the next instruction (e.g., to "select" or "press here") such that the user, when interacting with the first application, will be conveying the instructions to the proper location on the second application. In this manner, when the user is following the instructions displayed by the first application, they are actually interacting with the second application.

In some implementations, this process can continue until the particular task has been performed. For example, some applications could require many user inputs to perform a task, and the user device can provide updated instructions in the overlay provided by the first application until the task has been performed. In this example, guided support to change the ringtone of the user device can end after the user provides the last displayed input (e.g., pressing the "ringtone" option).

In this way, example implementation 100 can provide a user with an enhanced user experience (e.g., by obviating the need to research instructions or call customer support to potentially wait for a representative capable of providing step-by-step instructions). For an entity associated with the user device and/or an entity associated with an application associated with the particular task, enhancing user experience can lead to increased customer satisfaction with the entity's corresponding application and/or user device. Guided support, as described herein, also reduces resource usage for user devices, including battery usage, processing resources, memory resources, network resources, and/or the like, e.g., by quickly guiding a user to completing a particular task.

Figure 1B:
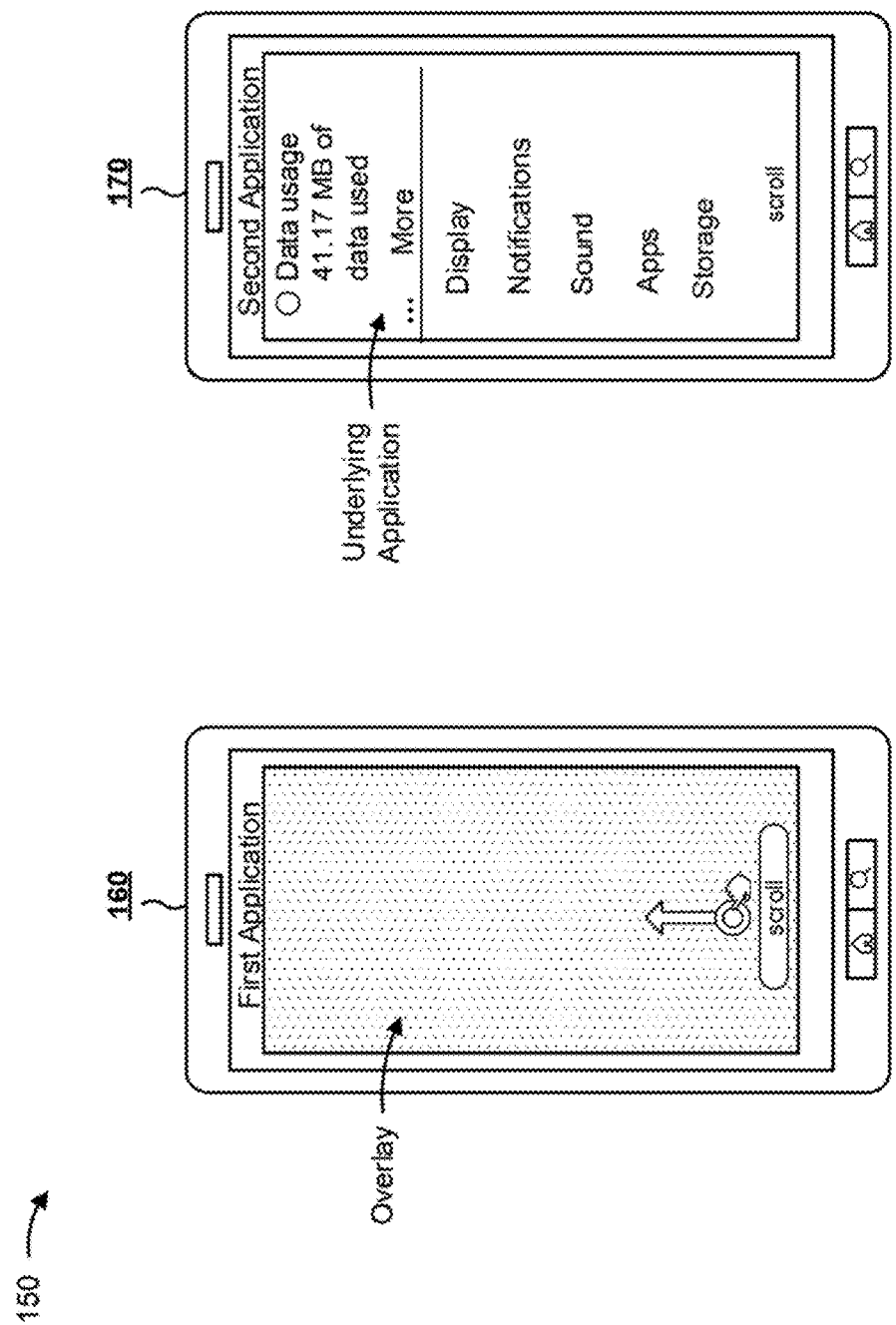

FIG. 1B is a diagram of an overview of an example implementation 150 described herein. As shown in FIG. 1B, example implementation 150 depicts separate layers, or user interfaces, provided using the first and second applications, e.g., as described FIG. 1A. For example, as shown by reference number 160, the depiction of the first application includes an interface providing an overlay, e.g., the support application overlay depicted by the user device at reference number 120 of FIG. 1A. As shown by reference number 170, the depiction of the second application includes an interface providing an application for performing a task, e.g., such as the settings application depicted by the user device at reference number 120 of FIG. 1A. While the support application example overlay and underlying second application are depicted separately in implementation 150, in practice the support application may present the overlay on top of the underlying second application, as described above and in further detail below.

As indicated above, FIGS. 1A and 1B are provided merely as examples. Other examples are possible and can differ from what was described with regard to FIGS. 1A and 1B. In practice, there can be additional devices, different devices, or differently arranged devices than the device shown in FIGS. 1A and 1B.

Figure 2:
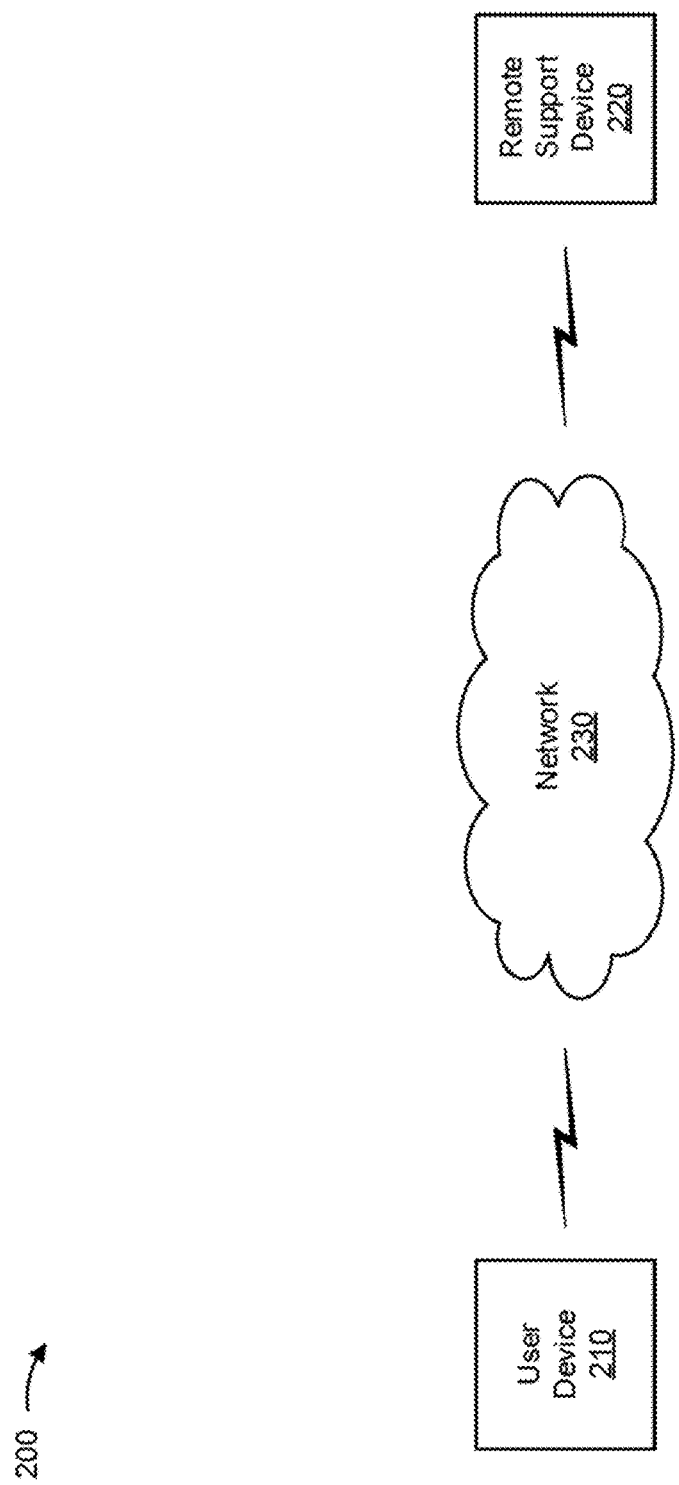
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a remote support device 220, and a network 230. Devices of environment 200 can interconnect via wired connections, wireless connections, optical connections, or a combination of connections.

User device 210 includes one or more devices capable of receiving, generating, storing, processing, displaying, and/or providing information associated with guided support for performing a task. For example, user device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 stores a support application that provides support guidance functions as described elsewhere herein. In some implementations, user device 210 can access a remote server to obtain the support application or updates to the support application. In some implementations, the support application can be pre-installed on user device 210.

Remote support device 220 includes one or more devices, such as a server computer, remote storage device, and/or the like, capable of providing user device with instructions for displaying guided support to perform a particular task. For example, remote support device 220 can include an application server capable of providing the support application to user device 210. As another example, remote support device can be a remote storage device, such as a remote hard drive or cloud storage device that stores guided support instructions for use by a support application that operates on user device 210. In some implementations, remote support device 220 can be operated by a user, such as customer support staff, which is capable of directing remote support device to selecting and/or providing guided support instructions to user device 210.

In some implementations, remote support device 220 generates and/or stores guided support instructions for use by user devices, such as user device 210. Guided support instructions can be generated in a variety of ways. In some implementations, a user and/or administrator of remote support device 220 might have created the instructions manually. For example, the instructions might have been generated by recording user interactions, applications used, and/or data displayed by user device 210 during the performance of the particular task. For example, software can record a series of user interactions with training device (e.g., a virtual or hardware device similar to user device 210), the series of interactions being designed to perform a task (e.g., change a ringtone of the training device), and the series of actions performed by the training device, including user interactions, can be stored as part of the instructions to perform the task (e.g., the instructions to change the ringtone for user device 210).

In some implementations, guided support instructions created by remote support device 220 can include data indicating user interface elements to be displayed by the first application during guided support). By way of example, the instructions can include data relating to icons, arrows, buttons, and/or other types of interface elements. In addition, the instructions can include information indicating how the interface elements are to be displayed, such as the size of the interface elements, the shape of the interface elements, the color of the interface elements, whether the interface elements are to be transparent or opaque when rendered for display, animations relating to the interface elements (e.g., flashing of the interface element), and/or the like.

Remote support device 220 can also be capable of storing guided support instructions in a variety of ways and making the instructions available to other devices, such as user device 210. For example, guided support instructions can be stored in a database and associated with a variety of different features, or metadata, such as the task associated with the instructions, the make, model, operating system, launcher software version, software application version(s), and/or the like of the device associated with the instructions. Guided support instructions can be stored, for example, in a manner that enables remote support device 220 to respond to a request for assistance with the appropriate instruction (e.g., which can be based on data included in the request that specifies information regarding the requesting device).

Network 230 includes one or more wired and/or wireless networks. For example, network 230 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
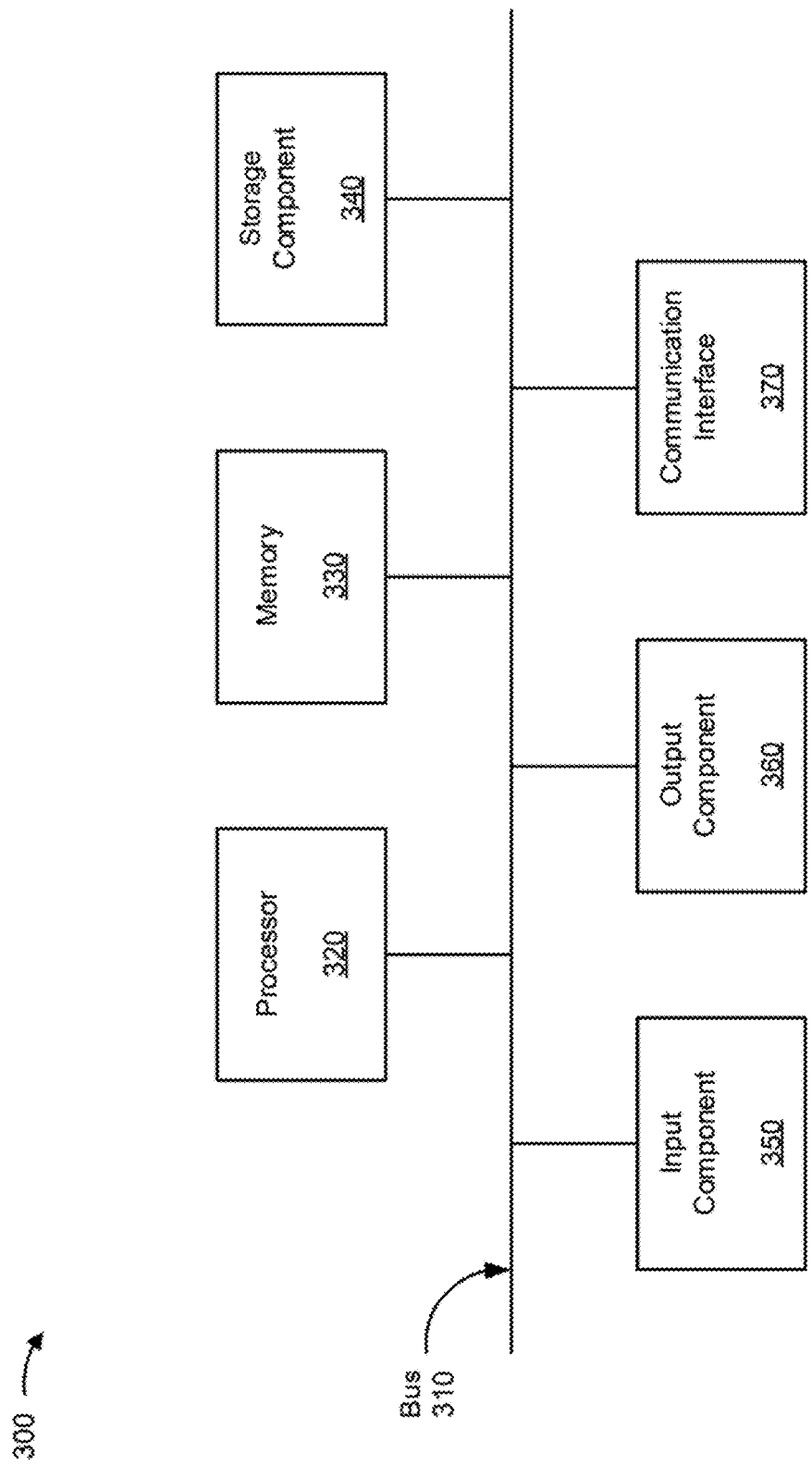
FIG. 3 is a diagram of example components of one or more devices of FIG. 2.

FIG. 3 is a diagram of example components of a device 300. Device 300 can correspond user device 210 and remote support device 220. In some implementations user device 210 and/or remote support device 220 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for providing guided support for performing a task. In some implementations, one or more process blocks of FIG. 4 can be performed by user device 210. In some implementations, one or more process blocks of FIG. 4 can be performed by another device or a group of devices separate from or including user device 210, such as remote support device 220.

As shown in FIG. 4, process 400 can include sending a request for assistance with performing a task (block 410). For example, user device 210 can send a request, or be used to send a request, for assistance related to performing a particular task related to user device 210 or an application or function associated with user device 210. The request can be sent by an application operating on user device 210, such as an operating system application, messaging application, voice calling application, support application, and/or the like. The request can be sent to a local data storage device and/or a remote device, such as remote support device 220.

In some implementations, the application used by user device 210 to send a request can vary. For example, a request can be sent from a web browsing application of user device 210 (e.g., the request can be in a search query or included in a packet sent by selecting a link). As another example, the application used by user device 210 to send a request can be a voice application (e.g., a user can call a customer support line and verbally send a request using user device 210). As yet another example, the application used by user device 210 to send a request can be a messaging application (e.g., a user can text customer support with a request for help using user device 210). In some implementations, the application used to send a request can be the same application used to provide guided support at user device 210. For example, the application used by user device 210 to send a request can be a support application (e.g., an application designed to be used for requesting support and receiving support instructions in a variety of ways, such as live chat with support, selectable support links, and/or the like).

In some implementations, user device 210 can send the request for assistance to a local data storage device. For example, user device 210 can use a support application to send the request as a query to a local support database that stores instructions for providing guided support for user device 210.

In some implementations, user device 210 can send the request for assistance to a remote support device 220, such as a remote storage device, remote customer support representative device, or support server (e.g., accessible via network 230). The request can be provided in a variety of forms, such as a verbal request, a request provided by SMS, a request included in one or more internet protocol (IP) packets, and/or the like.

In some implementations, a device separate from user device 210 can send the request. For example, the request can be sent to remote support device 220 from a third party customer support device, e.g., in a situation where a user of user device 210 is on the phone with a customer support representative, the representative can use a computing device to submit the request on behalf of the user of user device 210.

In some implementations, the request for assistance can include a variety of data designed to enable guided support instructions to be provided to user device 210. For example, the request can include data identifying various aspects of user device 210, such as a make, model, operating system, launcher software version, software application version(s), and/or the like.

In this way, user device 210 can request assistance with performing a task, which can enable the recipient of the request to provide instructions associated with the task.

As further shown in FIG. 4, process 400 can include receiving instructions associated with the task (block 420). For example, user device 210 can receive instructions based on sending the request for assistance (e.g., the instructions can be associated with the particular task indicated in the request). For example, user device 210 can receive the instructions from a local data storage device and/or a remote device, such as remote support device 220. The instructions are designed to be used by a first application of user device 210 to perform guided support. In some implementations, the first application can be the same application used to send the request for assistance (e.g., a support application). In situations where the first application is running on user device 210 when the instructions are received, the first application can receive the instructions. In situations where the first application is not running on user device 210, the instructions can cause user device 210 to launch the first application before providing the first application with the received instructions.

User device 210 can receive the instructions in a variety of ways. In some implementations, user device 210 can receive the instructions via a port-directed short message service (SMS) message. For example, remote support device 220 can send the instructions to user device 210 using a port-directed SMS message, in a manner designed to address the instructions to a particular port/application of user device 210 (e.g., directed to the first application). In some implementations, the instructions can be provided via one or more network packets. For example, remote support device 220 can provide the instructions in one or more IP packets that are addressed to user device 210 and/or the first application. In some implementations, the instructions can be provided by a local storage device. For example, the first application can obtain the instructions from data retrieved from a local database in response to a database query sent by the first application.

As described in further detail below, the instructions can include data that causes the first application operating on user device 210 to provide guided support for performing the particular task indicated by the request. In some implementations, the instructions can include a script. For example, the instructions can include ordered instructions for performing the particular task. The script can be executable by user device 210 (e.g., using the first application) to cause display of instructions for performing the particular task.

In some implementations, the instructions can include an application identifier that identifies a second application that can be used to perform the particular task. For example, for a task that involves activating a wireless hotspot, the application identifier might identify a settings application. As another example, for a task that involves adding a printer to available printers to user device 210, the application identifier might identify a printing application.

In some implementations, the instructions can include overlay data that is to be used by the support application to display instructions on user device 210. In some implementations, the instructions can include step-by-step instructions (e.g., instructions that indicate a series of user interactions to be performed in connection with the second application that can be displayed in an overlay provided by the first application). For example, the instructions can include data indicating when to display information, what is displayed, how long to display the information, when to change what information is displayed, and/or the like.

The instructions associated with the task can vary based on a variety of factors related to user device 210, such as user device 210 make and/or model, operating system software, launcher software (e.g., software designed to change the manner in which applications are displayed and/or launched), other application software, and/or the like. For example, the instructions can vary in ways that account for differences in phone resolution, differences in software that could cause differences in the second application to be used (e.g., the application used to perform the particular task), and/or differences in the type of user interactions to display. In some implementations, remote support device 220 can provide instructions appropriate for the user device 210 make, model, operating system software, etc. based on data included in the request In some implementations, user device 210 can use various forms of authentication to authenticate instructions, e.g., in a manner designed to ensure that the instructions were provided from an authorized device and/or that functionality associated with the instructions is authorized. For example, a public certificate can be used to authenticate the remote support device 220 that provides instructions. In addition, instructions can be associated with a public certificate, enabling authentication of particular instructions, such as scripts. For example, instructions that include a script to perform a particular task, such as changing a password, can cause user device 210 to determine authenticity of the instructions, e.g., using a public certificate associated with the instructions. The ability to authenticate remote support device 220 and/or instructions for performing a particular task can prevent unauthorized use and ensure appropriate use of guided support by user device 210.

In this way, user device 210 can receive instructions associated with the task, enabling user device 210 to launch a second application in a manner designed to provide a user with guided support for performing the particular task. In some implementations, the instructions enable user device 210 to launch the first application (e.g., in situations where the first application is not already running on user device 210).

As further shown in FIG. 4, process 400 can include launching, based on the instructions, an application associated with the task (block 430). For example, the first application operating on user device 210 can, based on the instructions, launch the second application (e.g., the application associated with the task). User device 210 can identify the second application based on the received instructions. In some implementations, launching the second application can include activating the second application (e.g., causing the second application to be displayed on user device 210), such as in situations where the second application is already running on user device 210.

As indicated above, the second application can be one of a variety of applications. For example, the second application can be an operating system application, a launcher application, a settings application, or the like. For an operating system application, the application can be one that a user interacts with through operating system features, like notification bar options or menu bar options, and/or the like. For a launcher application, the application can be an application that a user interacts with from a particular portion of the operating system, like a background application, a widget application, and/or the like.

In some implementations, user device 210 can launch the second application in a manner designed to ensure that the second application is the active application (e.g., the second application is on top, or currently displayed). In some implementations, user device 210 can launch the second application in a manner designed to ensure that the first application is activated on top of the second application (e.g., the second application is one below the first application, or next to be displayed by user device 210).

In this way, user device 210 can launch, based on the instructions, an application associated with the task, enabling user device 210 to provide an overlay for the second application (e.g., the overlay including instructions designed to guide a user of user device 210 to perform the particular task).

As further shown in FIG. 4, process 400 can include causing, based on the instructions, display of a transparent overlay overlaying a display of the application, the transparent overlay displaying user instructions (block 440). For example, user device 210 can use a first application to display a transparent overlay overlaying a display of the second application. The transparent overlay can display at least one user instruction (e.g., as specified by the instructions received at block 420). The display of the transparent overlay can be based on the instructions (e.g., which can control the manner in which the overlay is displayed). The transparent overlay is designed to provide a user with on-screen instructions while also providing the user with a view of the underlying second application.

In some implementations, the overlay can include a variety of features, including user interface elements and visual displays of information. For example, the overlay can include prompts for a user, icons, animations, application identifiers for the first and/or second application, and/or the like.

In some implementations, the transparency of the overlay can vary. For example, the transparency of the overlay can be transparent for all or a portion of the guided support, and/or animations can shift between transparent and opaque user interface elements (e.g., based on timing and/or receiving user input). As another example, all of the visual elements can be transparent, or just some of the elements can be transparent (e.g., an overlay can have a transparent background but opaque user instructions).

In some implementations, the user interface elements displayed in the overlay are based on the instructions. For example, the instructions can control when the overlay is displayed, and/or how long the overlay is displayed. In some implementations, the instructions can control which user interface element(s) (and/or animation(s)) are shown. In some implementations, as described in further detail below, the instructions can include data indicating when the overlay should change or end.

In this way, user device 210 can cause, based on the instructions, display of a transparent overlay overlaying the application, the transparent overlay displaying user instructions enabling a user to provide appropriate user input to user device 210.

As further shown in FIG. 4, process 400 can include receiving user input that corresponds to the user instructions (block 450). For example, user device 210 can receive user input from a user, and the user input can be input that corresponds to the user instruction(s) provided in the overlay. User input to user device 210 can take a variety of forms, such as input provided by microphone, mouse, keyboard, camera, touch-screen gesture, and/or the like. The user input can correspond to the user instructions, for example, by being the input that was displayed in the overlay. For example, in a situation where user instructions displayed in the overlay prompt a user to press a button, the user input can be a press of the button.

In this way, user device 210 can receive user input that corresponds to the user instructions, enabling user device 210 to perform an action based on the user input and the instructions.

As further shown in FIG. 4, process 400 can include performing an action based on the user input and the instructions (block 460). For example, user device 210 can perform an action based on the user input received at block 450 and the instructions received at block 420. In some implementations, user device 210 can perform the action using the first application (e.g., the application to which the instructions were provided in block 420). In some implementations, user device 210 can perform the action using the second application (e.g., the application to be used to perform the particular task). In some implementations, user device 210 can perform the action using a third application that is separate from the first and second applications. User device 210 can also, in some implementations, perform an action using multiple applications (e.g., the first and second applications can both be used by user device 210 to perform an action).

In some implementations, the action can include passing the user input from the first application to the second application. For example, while the first application displays the overlay, user input can be received by the first application and then passed to the second application. This can cause the second application to receive the user input.

In some implementations, the action can include processing the user input by an application. For example, the second application can process the user input. In this situation, user device 210 can cause the second application to scroll, make selection of a user interface element of a second application, cause the second application to process data, and/or the like.

In some implementations, the action can include reading information displayed by the second application. For example, the first application might (e.g., using an accessibility service or permission) read text and/or recognize objects displayed by the second application using accessibility features of user device 210. For example, user device 210 can include an accessibility service that is capable of identifying text and/or objects presented on a screen of user device 210. The first application can request, from the accessibility service of user device 210, data specifying the text and/or objects being displayed by the second application. Using the data provided by the accessibility service, the first application can determine whether particular data is displayed on the screen, such as whether particular text is displayed on the screen. In some implementations, the accessibility service can also provide, with the data specifying the text and/or objects being displayed, locations at which the corresponding text and/or objects are displayed. The data provided by the accessibility service can be used to determine whether the second application is displaying data specified by the instructions and the location of the data.

By way of example, in a situation where the instructions are for activating a Wi-Fi hotspot and the overlay includes instructions to scroll down a menu of options in a settings application, the first application can read (e.g., using the accessibility service) the options displayed by the second application after the second application has scrolled down (based on user input scrolling down), in an attempt to read an option that includes a Wi-Fi hotspot option. This can enable, for example, the first application to determine whether the Wi-Fi hotspot option is displayed by the second application and take action in accordance with the instructions. Based on a determination that the Wi-Fi hotspot option is not displayed by the second application, the instructions might cause the first application to continue displaying the same overlay (e.g., an overlay indicating that the user should scroll down). Based on a determination that the Wi-Fi hotspot option is displayed, and based on location data specifying the location on the screen of user device 210 at which the option is displayed, the first application can update the overlay, e.g., as described in further detail below.

As noted above, in some implementations, the action can include updating the overlay. In this situation, user device 210 (e.g., the first application operating on user device 210) can update the overlay in a variety of ways. For example, the overlay can be updated to display a second user instruction that was specified by the instructions received in block 420. As another example, if the user input received is not the expected user input, user device 210 can change the overlay to show data indicating that the user input is not the expected user input, and/or replay an animation of the instruction in the overlay. As another example, user device 210 can update the overlay by making it completely transparent (e.g., in situations where full visibility of second application is desirable, such as in response to a user interaction).

As another example, user device 210 can update the overlay based on the information read by the first application (e.g., as described above using accessibility). For example, if the user has scrolled down and the first application has read the Wi-Fi hotspot option after scrolling down, the overlay can be updated based on the identification of the Wi-Fi hotspot option (e.g., updated to display "select Wi-Fi hotspot" over the second application). In some implementations, the accessibility service can provide location information for text and/or objects identified in the information displayed by the second application, and user device 210 can update the overlay based on the location information. For example, the accessibility service might have identified a Wi-Fi hotspot option and a location (e.g., display coordinates) of the text associated with the Wi-Fi hotspot option; In this situation the instructions might cause the first application to update the overlay by placing a user interface element at or near the location identified for the Wi-Fi hotspot option (e.g., updating the overlay by displaying "select here" beside the location of Wi-Fi hotspot option of the underlying second application).

As yet another example, user device 210 can update the overlay to let the user know that the task has been completed. As still another example, user device 210 can update the overlay to allow the user to interact with a different interface element (e.g., based on a period of time passing, the first application might provide the user with a "go back" button or a "contact support" button).

In some implementations, the action can include launching a third application. For example, some tasks might use multiple applications to accomplish the particular task. To activate a Wi-Fi hotspot, a settings application could launch a Wi-Fi management application. As another example, creating a ringtone might use multiple applications (e.g., one application to create a ringtone from music/sounds and another application to change the ringtone from the current ringtone to the newly created ringtone).

In some implementations, the action can include communicating with a local data storage device and/or a remote device, such as remote support device 220. For example, the instructions received at block 420 might require an update (e.g., in situations where the first application detects that instructions might be out of date or an error occurs during guided support). In some implementations, the local/remote device might receive input indicating that the task has been completed, indicating that the instructions (e.g., script) used worked to perform the particular task.

In some implementations, the action can include closing an application. For example, when an application is no longer going to be used (e.g., as indicated by the instructions), the application can be closed. The action can include closing the first application and/or the second application.

In this way, user device 210 can perform an action based on the user input and the instructions, enabling user device 210 to provide a user with guided support for performing a particular task.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Some implementations, described herein, provide a device that is capable of providing a user device with instructions that are based on a user's request for assistance with performing a particular task. The instructions cause a first application of the user device (e.g., a support application) to launch a second application that is associated with the particular task and overlay instructions for the user to follow using the first application to provide the overlay. User input can be passed through the transparent overlay to the second application, and the first application can update the overlay with new instructions for the user to follow, e.g., based on reading the underlying data displayed by the second application. In this way, a user can be provided with instructions that enable the user to perform the particular task. In addition, the instructions can be tailored to the user device and/or software being used, and can be provided without using a customer service representative to provide step-by-step instructions.

In this way, implementations described herein can provide a user with an enhanced user experience (e.g., by obviating the need to research instructions or call customer support to potentially wait for a representative capable of providing step-by-step instructions). For an entity associated with the user device and/or an entity associated with an application associated with the particular task, enhancing user experience can lead to increased customer satisfaction with the entity's corresponding application and/or user device. In addition, by obviating the need to use a live customer support representative to provide users with step-by-step instructions, an entity that provides customer support services can save resources, including time, enabling customer support resources to be used for other tasks, reducing customer service wait times and further increasing user satisfaction with customer support services.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as might be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
provide, via a first application, a request for assistance with performing a task;
receive instructions associated with the task;
launch, based on the instructions, a second application associated with the task;
cause, based on the instructions, display of a first transparent overlay overlaying the second application on a display of the device,
the first transparent overlay including a first user instruction,
the first user instruction specifying a first touch-screen gesture;
receive, via the device, user input that corresponds to the first touch-screen gesture;
provide the user input to the second application;
identify, using an accessibility feature of the device to read information displayed by the display of the device, data displayed on the display of the device by the second application;
determine, based on the instructions, that the data displayed on the display of the device by the second application indicates that the first transparent overlay is to be changed to a second transparent overlay,
the second transparent overlay including a second user instruction,
the second user instruction specifying a second touch-screen gesture;
determine, based on the instructions and the data displayed on the display of the device by the second application, a location at which data specifying the second touch-screen gesture is to be displayed; and
cause, based on determining that the data displayed on the display of the device by the second application indicates that the first transparent overlay is to be changed to the second transparent overlay, the first application to display the second transparent overlay overlaying the display of the second application,
the second transparent overlay including, at the location, the data specifying the second touch-screen gesture.

2. The device of claim 1, where the one or more processors, when causing display of the first transparent overlay, are to:
use the first application to display the first transparent overlay,
the first application being different from the second application.

3. The device of claim 1, where the one or more processors, when providing the request for assistance with performing the task, are to:
use the first application to provide the request for assistance,
the first application being different from the second application.

4. The device of claim 1, where:
the instructions include a script to be executed by the first application.

5. The device of claim 1, where the one or more processors, when providing the request for assistance with performing the task, are to:
provide the request to a local data storage component; and
when receiving instructions associated with the task, are to:
receive the instructions from the local data storage component.

6. The device of claim 1, where the one or more processors, when providing the request for assistance with performing the task, are to:
provide the request to a remote support device; and
when receiving instructions associated with the task, are to:
receive the instructions from the remote support device.

7. The device of claim 6, where the one or more processors, when providing the request for assistance with performing the task, are to:
provide the request using internet protocol communications; or
provide the request using short message service communications, and
the one or more processors, when receiving instructions associated with the task, are to:
receive the instructions by port-directed short message service communications.

8. The device of claim 1, where:
the first touch-screen gesture is a selection; and
the second touch-screen gesture is a swipe.

9. A non-transitory computer-readable medium storing instructions, the instructions comprising:
one or more instructions that, when executed by one or more processors of a device, cause the one or more processors to:
provide a request for assistance with performing a task;
receive instructions associated with the task;
launch, based on the instructions, an application associated with the task;
cause, based on the instructions, display of a first transparent overlay overlaying a display of the application,
the first transparent overlay including a first user instruction,
the first user instruction specifying a first touch-screen gesture;
receive user input that corresponds to the first touch-screen gesture;
provide the user input to the application;
identify, using an accessibility feature of the device to read information displayed by the application, data displayed by the application;
determine, based on the instructions, that the data displayed by the application indicates that the first transparent overlay is to be changed to a second transparent overlay,
the second transparent overlay including a second user instruction,
the second user instruction specifying a second touch-screen gesture;

determine, based on the instructions and the data displayed by the application, a location at which data specifying the second touch-screen gesture is to be displayed; and cause, based on determining that the data displayed by the application indicates the first transparent overlay is to be changed to the second transparent overlay, display of the second transparent overlay overlaying the display of the application, the second transparent overlay including, at the location, the data specifying the second touch-screen gesture.

10. The non-transitory computer-readable medium of claim 9, where:

the first transparent overlay includes at least one opaque user interface element.

11. The non-transitory computer-readable medium of claim 10, where:

the at least one opaque user interface element includes an animation indicating the first user instruction.

12. The non-transitory computer-readable medium of claim 9, where the one or more instructions that cause the one or more processors to provide the request for assistance with performing the task, cause the one or more processors to:

provide the request using internet protocol communications; or provide the request using short message service communications.

13. The non-transitory computer-readable medium of claim 9, where the one or more instructions that cause the one or more processors to receive instructions associated with the task, cause the one or more processors to:

receive the instructions by port-directed short message service communications.

14. A method, comprising:

providing, by a device, a request for assistance with performing a task;

receiving, by the device, instructions associated with the task;

launching, by the device and based on the instructions, an application associated with the task;

causing, by the device and based on the instructions, display of a first transparent overlay overlaying a display of the application, the first transparent overlay including a first user instruction, the first user instruction specifying a first touch-screen gesture;

receiving, by the device, user input that corresponds to the first touch-screen gesture;

providing, by the device, the user input to the application;

identifying, by the device and using an accessibility feature of the device to read information displayed by the application, data displayed by the application;

determining, by the device and based on the instructions, that the data displayed by the application indicates that the first transparent overlay is to be changed to a second transparent overlay, the second transparent overlay including a second user instruction, the second user instruction specifying a second touch-screen gesture;

determining, by the device and based on the instructions and the data displayed by the application, a location at which data specifying the second touch-screen gesture is to be displayed; and causing, by the device and based on determining that the data displayed by the application indicates that the first transparent overlay is to be changed to the second transparent overlay, display of the second transparent overlay overlaying the display of the application, the second transparent overlay including, at the location, the data specifying the second touch-screen gesture.

15. The method of claim 14, further comprising:
processing, using the application, the user input.

16. The method of claim 14, further comprising:
launching, based on the instructions, a second application associated with the task.

17. The method of claim 14, where causing display of the first transparent overlay comprises:

using a second application to display the first transparent overlay, the second application being different from the application.

18. The method of claim 14, where providing the request for assistance comprises:

providing the request for assistance using a second application; and where receiving the instructions associated with the task comprises:

receiving the instructions using the second application.

19. The method of claim 14, where the instructions specify particular data that, when identified as being displayed by the application using the accessibility feature, causes the first transparent overlay to be changed to the second transparent overlay.

20. The method of claim 14, where:
the first touch-screen gesture is swipe; and
the second touch-screen gesture is a selection.

* * * * *